(12) United States Patent
Song et al.

(10) Patent No.: US 10,306,003 B2
(45) Date of Patent: *May 28, 2019

(54) SYSTEMS AND METHODS FOR PROVIDING INFORMATION REGARDING FUTURE CONTENT

(71) Applicant: Facebook, Inc., Menlo Park, CA (US)

(72) Inventors: Andrew Yaoshu Song, San Francisco, CA (US); Leo Litterello Mancini, San Francisco, CA (US); Bradley Ray Green, Snohomish, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/371,123

(22) Filed: Dec. 6, 2016

(65) Prior Publication Data

US 2017/0085662 A1    Mar. 23, 2017

Related U.S. Application Data

(63) Continuation of application No. 14/567,862, filed on Dec. 11, 2014, now Pat. No. 9,560,154.

(51) Int. Cl.
*H04L 29/06* (2006.01)
*H04L 29/08* (2006.01)
*G06F 17/30* (2006.01)
*H04W 4/21* (2018.01)

(52) U.S. Cl.
CPC ........ *H04L 67/26* (2013.01); *G06F 17/30867* (2013.01); *H04L 67/22* (2013.01); *H04W 4/21* (2018.02)

(58) Field of Classification Search
CPC .... G06F 17/30867; H04L 67/26; H04L 67/22
USPC ............... 709/228; 707/706, 726, 736, 737; 715/201, 761, 764, 712
See application file for complete search history.

(56) References Cited

U.S. PATENT DOCUMENTS

| | | | |
|---|---|---|---|
| 8,145,526 B2 | 3/2012 | Redlich | |
| 9,509,548 B2 * | 11/2016 | Webster | .................. H04L 67/26 |
| 2007/0038712 A1 * | 2/2007 | Affronti | ................. G06Q 10/06 709/206 |
| 2011/0010307 A1 * | 1/2011 | Bates | ..................... G06Q 30/02 705/347 |
| 2011/0173570 A1 * | 7/2011 | Moromisato | .......... G06Q 10/10 715/838 |

(Continued)

OTHER PUBLICATIONS

NPL document "GeoRank: An Efficient Location-Aware News Feed Ranking System"—Bao et al, Department of Computer Science & Enginerring, University of Minnesota, Aug. 2013 https://www-users.cs.umn.edu/~mokbel/papers/gis13a.pdf (Year: 2013).*

(Continued)

*Primary Examiner* — Randy A Scott
(74) *Attorney, Agent, or Firm* — Sheppard Mullin Richter & Hampton LLP

(57) ABSTRACT

Systems, methods, and non-transitory computer-readable media can determine a frequency by which content items published by an entity are to be provided for a user. Examples of content items previously published by the entity are selected. Information is provided to assist the user in a determination about whether to assent to provision of content items published by the entity for the user.

20 Claims, 10 Drawing Sheets

(56) References Cited

U.S. PATENT DOCUMENTS

2014/0139609 A1   5/2014   Lu

OTHER PUBLICATIONS

Pazzani, Michael J. et al., "Content-Based Recommendation Systems," The Adaptive Web, Lecture Notes in Computer Science (LNCS), vol. 4321, pp. 325-341, 2007.

* cited by examiner

SYSTEMS AND METHODS FOR PROVIDING INFORMATION REGARDING FUTURE CONTENT

CROSS-REFERENCE TO RELATED APPLICATIONS

This application is a continuation of U.S. patent application Ser. No. 14/567,862, filed on Dec. 11, 2014 and entitled "SYSTEMS AND METHODS FOR PROVIDING INFORMATION REGARDING FUTURE CONTENT", which is incorporated herein by reference.

FIELD OF THE INVENTION

The present technology relates to the field of communications. More particularly, the present technology relates to techniques for providing information regarding future content.

BACKGROUND

Today, people utilize computing devices (or systems) for various purposes. Users can use their computing devices to interact with one another, access content, share content, and create content. A user can utilize his or her computing device to interact with a social networking system (or service), such as by providing, viewing, or otherwise accessing information through the social networking system. In some cases, the social networking system can provide an interface or medium for users of the social networking system to communicate with one another.

In one example, an organization that publishes content may become a user of the social networking system. Another user of the social networking system may interact with the organization in ways typical of communication between any users of a social networking system. For example, the communications between the organization and the user may be direct, leveraging, for example, email or instant messaging as the desired communication vehicle. As another example, the communications between the organization and the user may be indirect. In this regard, the user may learn about content published by the organization on the social networking system by visiting a page of the social networking system associated with the organization. Another indirect mode of communication may involve automatically conveying posts by the organization in a feed provided to the user to apprise the user of the availability of content.

SUMMARY

Various embodiments of the present disclosure can include systems, methods, and non-transitory computer readable media configured to determine a frequency by which content items published by an entity are to be provided for a user. Examples of content items previously published by the entity are selected. Information is provided to assist the user in a determination about whether to assent to provision of content items published by the entity for the user.

In an embodiment, the provision of content items published by the entity for the user is to a feed associated with the user.

In an embodiment, at least one media type of the content items published by the entity is determined.

In an embodiment, at least one topic of the content items published by the entity is determined.

In an embodiment, the information to assist a user in a determination about whether to assent to provision of content items published by the entity for the user includes the frequency by which content items published by the entity are to be provided for the user and the examples of content items previously published by the entity.

In an embodiment, the information to assist a user in a determination about whether to assent to provision of content items published by the entity for the user further includes at least one media type and at least one topic of the content items published by the entity.

In an embodiment, the determining a frequency by which content items published by an entity are to be provided for a user is based at least in part on at least one of historical publication of content items by the entity, historical engagement by a general audience with a page associated with the entity, quality of content items, and other feed inventory of the user.

In an embodiment, the determining a frequency by which content items published by an entity are to be provided for a user includes assigning values to each of the at least one of historical publication of content items by the entity, historical engagement by a general audience with a page associated with the entity, quality of content items, and other feed inventory of the user.

In an embodiment, the determining a frequency by which content items published by an entity are to be provided for a user further includes assigning a weight to each of the values to result in weighted values.

In an embodiment, the determining a frequency by which content items published by an entity are to be provided for a user further includes aggregating the weighted values to determine the frequency.

In an embodiment, the selecting examples of content items previously published by the entity is based at least in part on at least one of most recent content items published by the entity, most typical content items published by the entity, and content items published by the entity most relevant to the user.

In an embodiment, the selecting examples of content items previously published by the entity includes identifying a set of candidate content items from each of most recent content items published by the entity, most typical content items published by the entity, and content items published by the entity most relevant to the user.

In an embodiment, the selecting examples of content items previously published by the entity further includes assigning values to each of the candidate content items in each set of candidate content items.

In an embodiment, the selecting examples of content items previously published by the entity further includes assigning a weight to each of the values associated with a candidate content item to result in weighted values, the weight based on an association between the content item and one of the most recent content items published by the entity, the most typical content items published by the entity, and the content items published by the entity most relevant to the user; ranking the weighted values to create a subset of highest ranking content items; and assigning the highest ranking content items as the examples of content items for display to the user.

In an embodiment, at least one media type of the content items published by the entity is determined, wherein determination of the at least one media type is based on a previous posting history of the entity and a category to which the entity belongs. At least one topic of the content items published by the entity is determined, wherein determination of the at least one topic of the content items published by the entity is based on historical topics of content items previously published by the entity.

In an embodiment, a preview screen is generated in which the information is reflected.

In an embodiment, the preview screen includes an identification section to identify the entity; a description section to display information including at least one of the frequency by which content items published by an entity are to be provided for a user, at least one media type of the content items published by the entity, and at least one topic of the content items published by the entity; and an examples section to display the examples of content items previously published by the entity.

In an embodiment, the information displayed in the description section is changed. The information displayed in the identification section and the examples section is maintained.

Many other features and embodiments of the invention will be apparent from the accompanying drawings and from the following detailed description.

Figure 1:
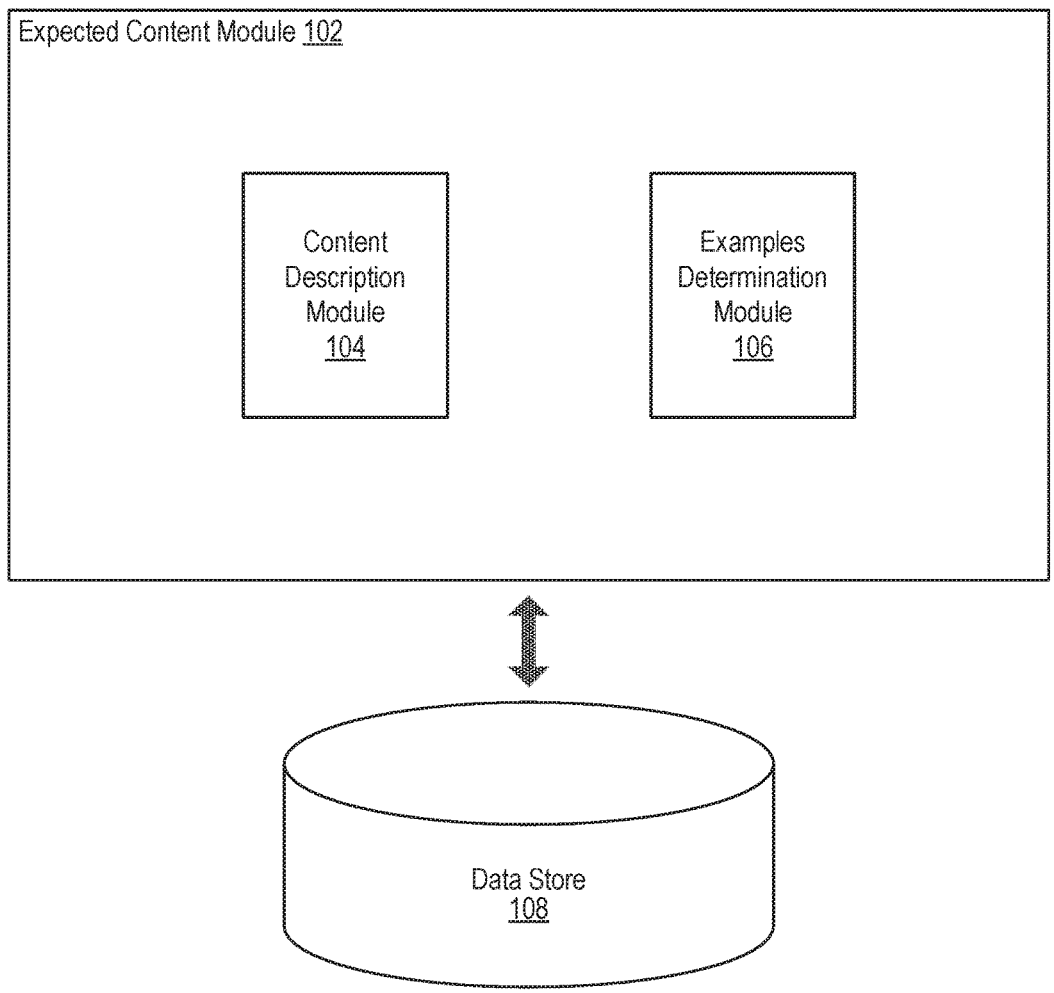
FIG. 1 illustrates an example system including an example expected content module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Information Regarding Expected Content

People use social networking systems (or services) for a wide variety of purposes. Users of a social networking system can utilize their computing devices (or systems) to establish connections, communicate, and interact with one another via the social networking system. Users of the social networking system can also create, access, and share various types of content. The social networking system can provide an interface or medium through which news, messages, information, and all types of content are transmitted.

An entity (e.g., organization, group, individual, etc.) that publishes or otherwise provides content may become a user of the social networking system. Interactions between the entity and another user of the social networking system may mirror communication between any users of a social networking system. For example, the communications between the entity and another user may be direct, leveraging, for example, email or instant messaging as the desired communication vehicle. In particular, content may be directly communicated from the entity to the other user. As another example, the communications between the entity and the user may be indirect. In this regard, the user may learn about content published by the entity on the social networking system by visiting a page of the social networking system associated with the entity. Another indirect mode of communication may involve leveraging a feed of the user to provide content, or an indication thereof (e.g., a link to the content), from the entity to the user.

Content provided by the entity may be included in the feed of the user upon assent by the user. In some circumstances, the social networking system may determine that the entity, or its content, and the user share have a relationship or share affinity sufficient to invite the user to receive content provided by the entity in the feed of the user. For example, the invitation may take the form of a suggestion provided to the user to receive content published on a page associated with the entity. If the user accepts the invitation, the social networking system may provide in the feed of the user the content published by the entity.

Such provision of content can have many drawbacks. The invitation to receive content in the feed of a user provides little information about the entity and the type of content normally published on its page. From the perspective of the user, the content provided to the user accordingly may not align with the interests of the user. In addition, the frequency of the content provided to the user may conflict with expectations of the user. For example, the user may desire in her feed only occasional notices about content published by the entity. If the entity is especially prolific in publishing content and if the social networking system provides all content published by the entity in the feed of the user, the user will be subjected to a suboptimal experience. From the perspective of the entity, it can be important to create excitement and interest in the content published by it. The provision of content to an audience that is not likely to enjoy it accordingly undermines the goals of the entity.

Various embodiments of the present disclosure overcome the shortcomings associated with the provision of content items (e.g., content, references to content, links to content, summaries of content, etc.) in the feeds of users in the conventional manner. In accordance with various embodiments of the present disclosure, content items published or otherwise provided by an entity can be suggested to a user in a more effective manner. In particular, the user may be provided specific information (e.g., a preview) regarding what the user may expect to see in her feed if the user indicates support for (e.g., likes) a particular page associated with the entity. In some implementations, descriptions and examples of posts (or publications) that the user may potentially encounter in the feed of the user may be provided.

A description of the content items to be potentially included in the feed of the user can be provided. A number of posted content items (or posts) from the page of the entity that the user can expect to see in her feed can be estimated and presented to the user. In some cases, the estimated number can be determined by taking into account the overall historical engagement for the entity (or associated page), the quality and volume of content items posted by the entity, and the amount of other feed information provided to the user. Further, at least one media type associated with typical posts of the entity and at least one topic associated with typical posts by the entity can be provided. Accordingly, the estimated number of content items, the media type(s) of the content items, and the topics of the content items can be included in the description. In some instances, the description can take the form of an automatically generated statement about the entity and the content items published by it.

Moreover, example content items provided by the entity can be presented to the user. In some instances, the example content items can be of the same media type (e.g., articles, photos, videos, etc.) as those typically posted by the entity. The example content items can be selected from the most recent content items posted by the entity, the most typical content items posted by the entity, and, in relation to the user, the overall best (e.g., most relevant, most popular, etc.) content items posted by the entity. The description and the example content items can be provided to the user to enable the user to make an informed decision regarding whether or not to support the entity and its page, and accordingly receive content items published by the entity in the feed of the user.

FIG. 1 illustrates an example system 100 including an example expected content module 102 configured to facilitate provision to a user of information about expected content items published by an entity in a feed of the user. The entity may be associated with a dedicated page (or pages) of a social networking system where information, such as content items, of the entity may be posted (or published) for access by other users of the social networking system. In some embodiments, the expected content module 102 can include a content description module 104 and an examples determination module 106. The expected content module 102 may communicate with a data store 108. The data store 108 can be configured to store and maintain various types of data. In some implementations, the data store 108 can store information associated with a social networking system. The information associated with the social networking system can include data about users, social connections, social interactions, locations, maps, places, events, groups, posts, media, communications, and various other types of data. Some or all of such data may be reflected in a social graph, as described in more detail herein.

The content description module 104 can be configured to determine a description of content items provided by the entity. The description may include one or more of an identification of an entity of which content items may be provided to a user through her feed; an estimated frequency (or frequency range) with which the user may expect to receive content items in her feed; an identification of the media type and the topics of the content items; and, representations of examples of the content items. The description of content items may be provided in a preview screen inviting the user to accept receipt of content items from the entity. The content description module 104 is discussed in more detail herein.

The examples determination module 106 can be configured to determine examples to be provided to a user in the preview screen. The examples determination module 106 can determine the media type of the examples of content items to be provided to the user. Possible media types include, but are not limited to, articles, photos, and video. The media type of the examples of the content items can be selected based on, for example, the previous posting history of the entity and the category to which the entity belongs. The examples determination module 106 also can be configured to select examples of content items to be displayed in the preview screen. The selection of examples can be based on the most recent content items posted by the entity, the most typical content items posted by the entity, and content items most optimal for presentation to the user. The examples determination module 106 is discussed in more detail herein.

Figure 2:
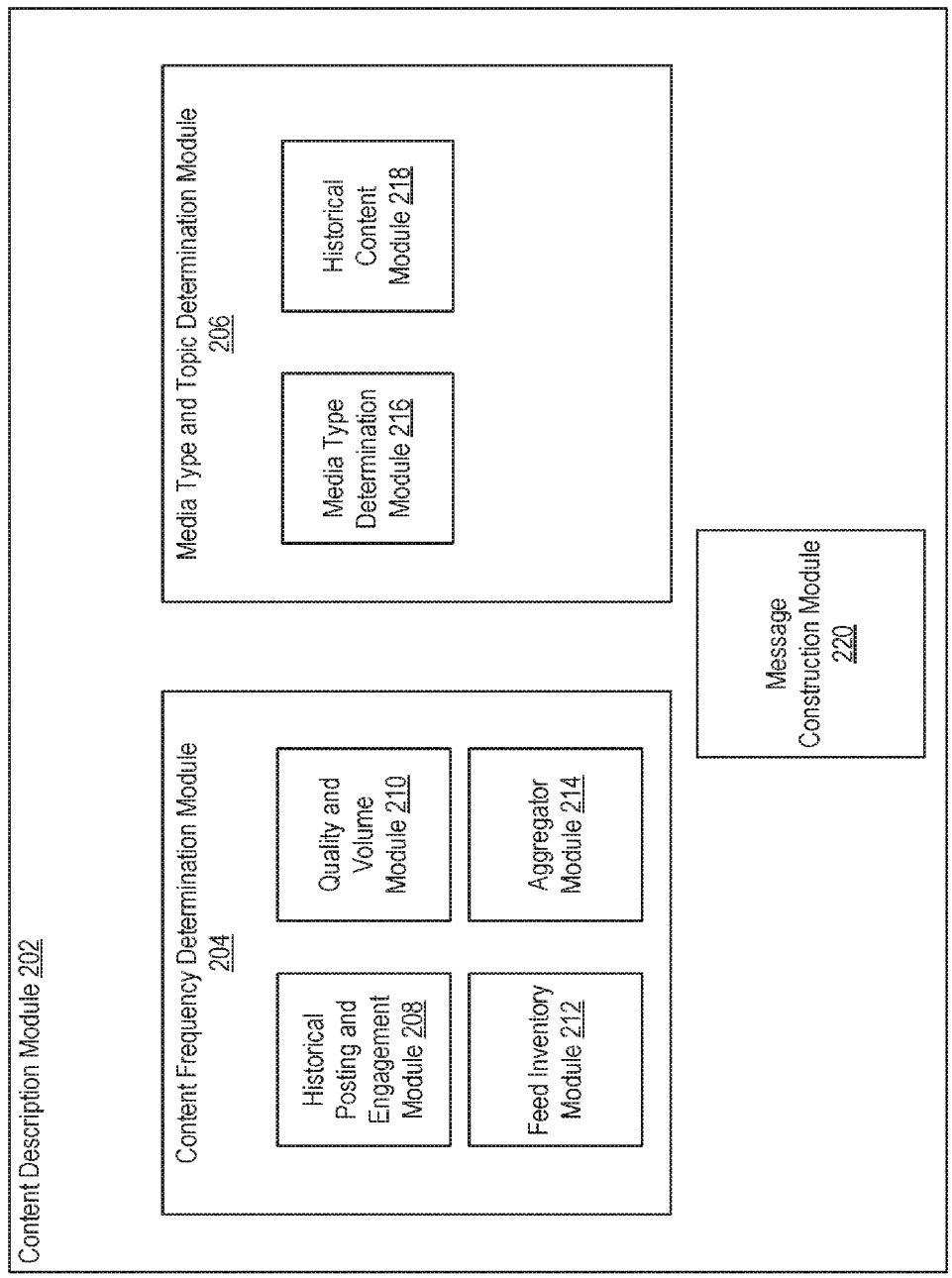
FIG. 2 illustrates an example content description module, according to an embodiment of the present disclosure.

FIG. 2 illustrates an example content description module 202 configured to determine a description of the content items for presentation to the user, according to an embodiment of the present disclosure. In some embodiments, the content description module 104 of FIG. 1 can be implemented as the content description module 202. As shown, the content description module 202 can include a content frequency determination module 204, a media type and topic determination module 206, and a message construction module 220.

The content frequency determination module 204 can be configured to determine an estimated frequency (or frequency range) by which content items are to be delivered to a user through her feed. The content frequency determination module 204 can include a historical posting and engagement module 208, a quality and volume module 210, a feed inventory module 212, and an aggregator module 214. The historical posting and engagement module 208 can be configured to determine the magnitude of posting activity by the entity and the general level of engagement between users and a page associated with the entity. With respect to the magnitude of posting activity by the entity, the historical posting and engagement module 208 may determine how many posts the entity has made in a given period of time. The historical posting and engagement module 208 may determine an estimate of a future magnitude of total posting activity by the entity in a given period of time based on historical values.

With respect to the general level of engagement between users and a page associated with the entity, the historical posting and engagement module 208 may obtain interaction data associated with the page associated with the entity. The page may reflect all or some of the content items posted by the entity for consumption by the users. The general level of engagement reflects interactions between users and the entity without undue focus on any one particular content item. For example, the general level of engagement can be based on one or more of a total number of views of the page associated with the entity, a total number of subscriptions by users to the page, a number of likes associated with the page or specific content items thereof, a number of shares by users of the page or specific content items thereof, etc. Other suitable metrics reflecting engagement levels between users and the page may be used.

The quality and volume module 210 can be configured to determine a quality level of a particular content item. The quality level reflects the appeal or popularity of a particular content item. For example, the quality level can be based on one or more metrics, including but not limited to a number of views of the content item, a number of likes associated with the content item, a number of shares by users of the page or specific content items thereof, etc. In some instances, a higher quality level for a content item may result from a higher value of the foregoing metrics and a lower quality level for a content item may result from a lower value of the foregoing metrics.

Further, the quality and volume module 210 can determine a volume or concentration of appeal with respect to the content item. The quality level of the content item accordingly can be further based on the volume or concentration of appeal with respect to the content item. For example, if it is determined that a first content item has been viewed by 45% of the total audience for the page of the entity and a second content item has been viewed by 5% of the total audience for the page of the entity, the quality and volume module 210 may determine that the first content item should have a higher quality level. Likewise, as another example, if it is determined that a first content item has been viewed by 85% of the total audience for the page of the entity and a second content item has been viewed by 15% of the total audience for the page of the entity, the quality and volume module 210 may determine that the second content item should have a lower quality level.

The feed inventory module 212 can be configured to account for feed activity other than the provision of content items from the entity if the user accepts the invitation to receive such content items. For example, myriad rules based on, for example, the affinity between the user and other organizations of the social networking system and user preferences regarding content items desired for the feed may influence or dictate the type and amount of content items to be provided to the user in her feed. As another example, a constraint may dictate that a certain maximum number of content items may be presented in a feed of the user in a predetermined period of time. The constraint may reflect a preference not to overwhelm the user with an undue number of content items so as to preserve a positive user experience. These examples of rules and a constraint relating to the presentation of content items in the feed may impact the frequency with which content items from the entity can be delivered to the user. The feed inventory module 212 may account for these rules and constraints in determining the frequency with which to provide content items from the entity in the feed of the user.

For example, assume the user has strong connections (e.g., high affinities) with many other organizations that publish content and that the user has already assented to receiving content items from these organizations in her feed. Assume further that these connections are stronger than her connection with the entity. In this example, fewer of the content items of the entity may be provided to the user in her feed because the user may wish to receive more content items from the organizations with which she enjoys stronger connections.

As another example, assume that the user has few connections and accordingly the content items delivered to her are relatively few. In this example, more or all of the content items of the entity may be provided to the user in her feed because there is ample capacity in her feed to accommodate the content items.

The aggregator module 214 can be configured to account for the determinations in the historical posting and engagement module 208, the quality and volume module 210, and the feed inventory module 212 to determine a frequency (or frequency range) by which to deliver content items of the entity to the feed of the user. In some embodiments, the aggregator module 214 can determine or assign a numerical value to each determination of the historical posting and engagement module 208, the quality and volume module 210, and the feed inventory module 212. Each of the numerical values can be multiplied by a weighting factor to result in a weighted value. The weighted values can be aggregated to determine an aggregate number informing the frequency by which content items of the entity should be provided to the user. The determined frequency should not be greater than the estimate of the magnitude of total posting activity by the entity.

For example, a value may be appropriately assigned to each determination of the historical posting and engagement module 208, the quality and volume module 210, and the feed inventory module 212, with greater values indicating the propriety of a relatively higher frequency or frequency range by which to provide content items to the user. Based on the importance of each determination of the historical posting and engagement module 208, the quality and volume module 210, and the feed inventory module 212, a weighting factor can be multiplied to each value to produce weighted values. The weighted values then could be aggregated (e.g., summed and divided by a normalizing value). The aggregate value could be multiplied with the estimate of the magnitude of total posting activity by the entity to result in the determination of a frequency by which to provide content items of the entity in the feed of the user. The determination of the frequency by which to provide content items in the feed of the user can be based on other quantitative (or qualitative) techniques involving one or more of the historical posting and engagement module 208, the quality and volume module 210, and the feed inventory module 212.

The media type and topic determination module 206 can be configured to determine a media type and topics relating to the content items to be provided to the feed of the user. The media type and topic determination module 206 can include a media type determination module 216 and a historical content module 218. The media type determination module 216 can determine the media type that the entity typically has published in the past. For example, the media type determination module 216 can determine that, if the entity is a newspaper, the media type of the content items published by the entity is largely articles. As another example, the media type determination module 216 can determine that, if the entity is a provider of online movies, the media type of the content items published by the entity is largely videos.

The media type determination module 216 may also use a category to which the entity is assigned to determine the media type of content items published by the entity. In some embodiments, entities of the social networking system are systematically categorized according to their profiles, interests, activities, and other attributes. In some instances, the entities may assign themselves to categories. In other instances, the entities may be assigned to categories by others (e.g., connections, polling, the social networking system, etc.). The category to which an entity is assigned may inform the typical media type(s) of its content items. For example, when the entity is a local newspaper, it may fall into the category of periodicals, which is associated with the media type of articles. As another example, when the entity is wall calendar designer, the entity may fall into the category of print publishers, which is associated with the media type of photos.

The historical content module 216 can help to determine the topics of the content items that the entity typically has historically published. The topics can be of any subject matter or theme in which content items can be categorized. For example, the historical content module 216 can determine that the entity has consistently published content items on topics such as oceans, water recreation, and ecological awareness. Historical topics can be determined by one or more conventional techniques, such as topic tagging. Topic tagging, as an example, can involve the use of contextual information surrounding a content item (e.g., the identities and profiles of users who interact with the content item, comments provided in relation to the content item, etc.) to infer the topic of the content item. The determination of historical topics can be used to predict future topics of the content items published by the entity.

The message construction module 220 can be configured to construct one or more messages describing the content items to be provided to the user in her feed. The message construction module 220 can be based at least in part on the determination of a frequency by the content frequency determination module 204 with which content items are to be provided in the feed of the user; a determination of media type(s) of the content items by the media type and topic determination module 206; and a determination of topics of the content items by the medial type and topic determination module 206. The message construction module 220 may design templates for one or more messages that can incorporate the determination of a frequency by the content frequency determination module 204 with which content items are to be provided in the feed of the user; a determination of media type(s) of the content items by the media type and topic determination module 206; and a determination of topics of the content items by the medial type and topic determination module 206.

For example, the message construction module 220 may construct two messages to be presented to the user in an alternating sequence. The first message may relate to the frequency by which the content items are to be provided in the feed of the user. For instance, the message construction module 220 may design a message template with the following format: "_____ [number of posts] in your feed each week", where the number of estimated posts of content items by the entity is inserted into the blank. The second message may relate to the media type(s) and the topics of the content items to be provided in the feed of the user. For instance, the message construction module 220 may design a message template with the following format: "_____ [entity name] posts _____ [media type] about _____ [topic 1], _____ [topic 2], _____ [topic 3], . . . ", where the name of the entity is inserted into the first blank, the media type(s) of content items published by the entity is inserted into the second blank, and topics of the content items are inserted into the third, fourth, and fifth blanks. When the blanks are completed with appropriate information, such messages can be presented to the user in the preview screen to inform the user about the content items that she potentially can receive. Other suitable types of templates and messages can be generated by the message construction module 220 and presented to the user to describe the content items that will be potentially provided to the user in her feed.

Figure 3:
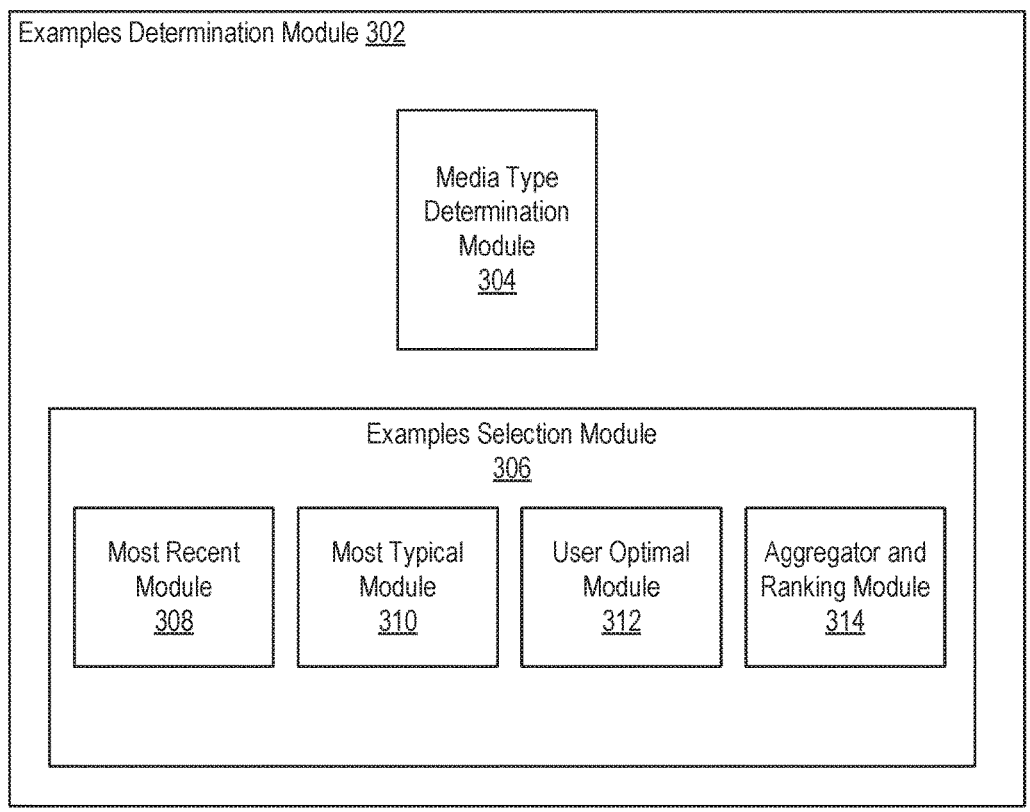
FIG. 3 illustrates an example examples determination module, according to an embodiment of the present disclosure.

FIG. 3 illustrates an example examples determination module 302 configured to select examples of content items of the entity to be provided to the user, according to an embodiment of the present disclosure. In some embodiments, the examples determination module 106 of FIG. 1 can be implemented as the examples determination module 302. As shown in the example of FIG. 3, the examples determination module 302 can include a media type determination module 304 and an examples selection module 306. The media type determination module 304 is designed and functions in a manner similar to the media type determination module 216, as described herein. In an embodiment, the media type determination module 304 is the same module and is implemented as the media type determination module 216.

The examples selection module 306 can select examples of content items of the media type determined by the media type determination module 304. The examples selection module 306 can include a most recent module 308, a most typical module 310, a user optimal module 312, and an aggregator and ranking module 314. The most recent module 308 can determine the content items of the desired media type most recently published by the entity. The most typical module 310 can determine the content items of the desired media type most typical of the content items published by the entity.

The user optimal module 312 can determine the content items of the desired media type that are most desirable or relevant to the user. The determination of optimal content items can be based on a variety of considerations, such as the recency of the posting of the content item, the prior engagement level of the user with the topic associated with content item, and the general audience engagement with the content item.

With the respect to recency, the user optimal module 312 can identify for consideration content items previously published by the entity that are most recent. Most recent content items are more likely to be relevant to the user and less likely to be considered stale. In some instances, the most recent content items may be selected based on a predetermined threshold duration of time before the time at which the preview screen is to be shown to the user. Content items that fall within the threshold duration may be candidates for provision to the user. Content items that fall outside the threshold duration are excluded from consideration.

With respect to the prior engagement level of the user, the user optimal module 312 can identify for consideration content items published by the entity that are associated with topics with which the user has had high levels of engagement or otherwise shown significant interest. For example, the user may have a history of reviewing content items from various sources relating to certain topics. As another example, the activity of the user may reflect a strong trend to like content items of a certain topic. As yet another example, the strongest connections with the user in the social networking system may have significant levels of engagement with pages associated with certain topics. When topics of special interest can be discerned in these and other manners, the user optimal module 312 may select content items of the entity that are associated with the topics as example content items to be presented in the preview screen.

With respect to general audience engagement, the user optimal module 312 can identify for consideration content items previously published by the entity that met with widespread appeal from a general audience of users. In many instances, the more a general audience of users consumed a content item, the more likely the user will desire to consume the content item. For example, the user optimal module 312 may provide a threshold number of views of the content items, likes of the content item, shares of the content item, etc. If any content item satisfies the threshold number, the user optimal module 312 may select the content item for presentation in the preview screen for the user.

The aggregator and ranking module 314 can select a subset of content items from the set of content items identified by the most recent module 308, the most typical module 310, and the user optimal module 312. The selection of the subset of content items can be provided in the preview screen as examples of content items of the entity. The selection of the subset may be performed according to a number of techniques. For example, a numerical value can be assigned to each content item identified by the most recent module 308, the most typical module 310, and the user optimal module 312. The numerical value may reflect the relevance or desirability of the content item to the user. Further, in this example, the numerical values can be weighted according to the importance of the most recent module 308, the most typical module 310, and the user optimal module 312 relative to one another. The aggregator and ranking module 314 can then rank the content items by their weighted values and select a predetermined number of the highest ranking content items to be shown as examples in the preview screen. Other suitable techniques to select a subset of content items from the set of identified content items are possible.

Figure 4:
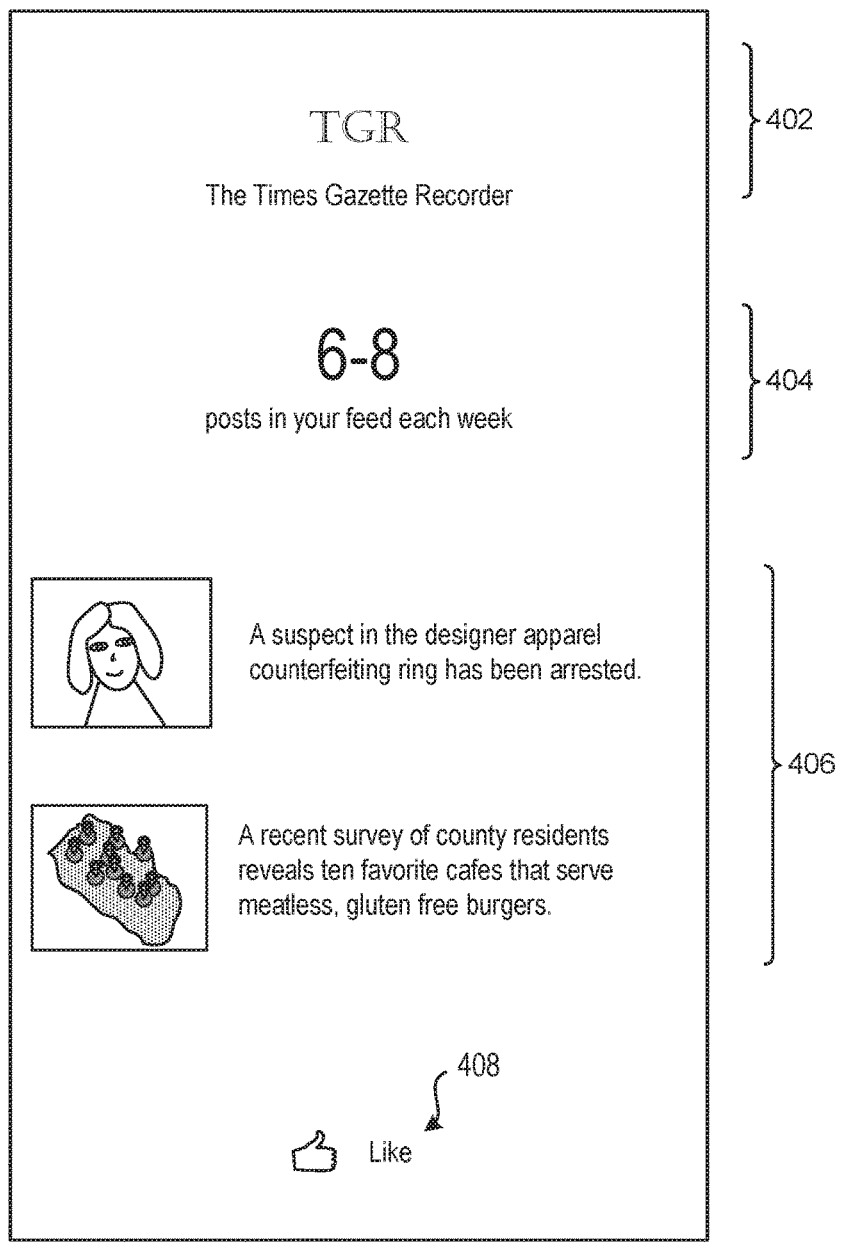
FIG. 4 illustrates an example preview screen, according to an embodiment of the present disclosure.

FIG. 4 illustrates an example preview screen 400 to provide information to assist the user in determining whether to agree to receive content items from an entity, according to an embodiment of the present disclosure. An identification section 402 of the preview screen 400 can display the identity of the entity, such as a logo and business name of the entity. A description section 404 may display the frequency by which the estimated number of content items are to be provided to the user in her feed in a selected amount of time. An examples section 406 may display selected examples of previously published content items of the entity. The user may assent to the receipt of content items from the entity by clicking a link 408. As shown in the example of FIG. 4, the entity is a newspaper from which six to eight posts of content items per week will be provided to a feed of the user upon the selection of "like". The presented examples of content items provide to the user a sampling of the content items that the entity has published before and suggest the types of content items the entity likely will publish in the future and provide to the user in her feed. Upon selection of "like", the social networking system may begin to provide content items published by the entity in the feed of the user.

Figure 5:
FIG. 5 illustrates an example preview screen, according to an embodiment of the present disclosure.

FIG. 5 illustrates an example preview screen 500 to provide information to assist the user in determining whether to agree to receive content items from an entity, according to an embodiment of the present disclosure. The preview screen 500 may contain an identification section 502, a description section 504, and an examples section 506. The display of information in the preview screen 500 can follow a predetermined amount of time after the display of information in the preview screen 400 as illustrated in FIG. 4. In some instances, the display of information in the preview screen 500 as illustrated in FIG. 5 can be identical or similar to the display of information in the preview screen 400 as illustrated in FIG. 4, except for the description section 404 and the description section 504. In some embodiments, after the passage of the predetermined amount of time, the description section 504 may no longer display the frequency by which the estimated number of content items are to be provided to the user in her feed in a selected amount of time, as shown in the preview screen 400. Rather, the description section 504 may display a statement regarding the media types and the topics of the content items to be potentially provided by the entity in the feed of the user. In some embodiments, the information displayed in the description section 504 may return to the information displayed in the description section 404 after a selected amount of time. In this manner, the description sections 404, 504 may present an alternating, sequential display of different information. In some embodiments, the information in the description section 404 does not change and the information in the description section 504 does not change. As shown in the example of FIG. 5, the user is notified that the media type of the content items of the newspaper is largely articles and that the topics of the content items are news, politics, and social trends.

Figure 6:
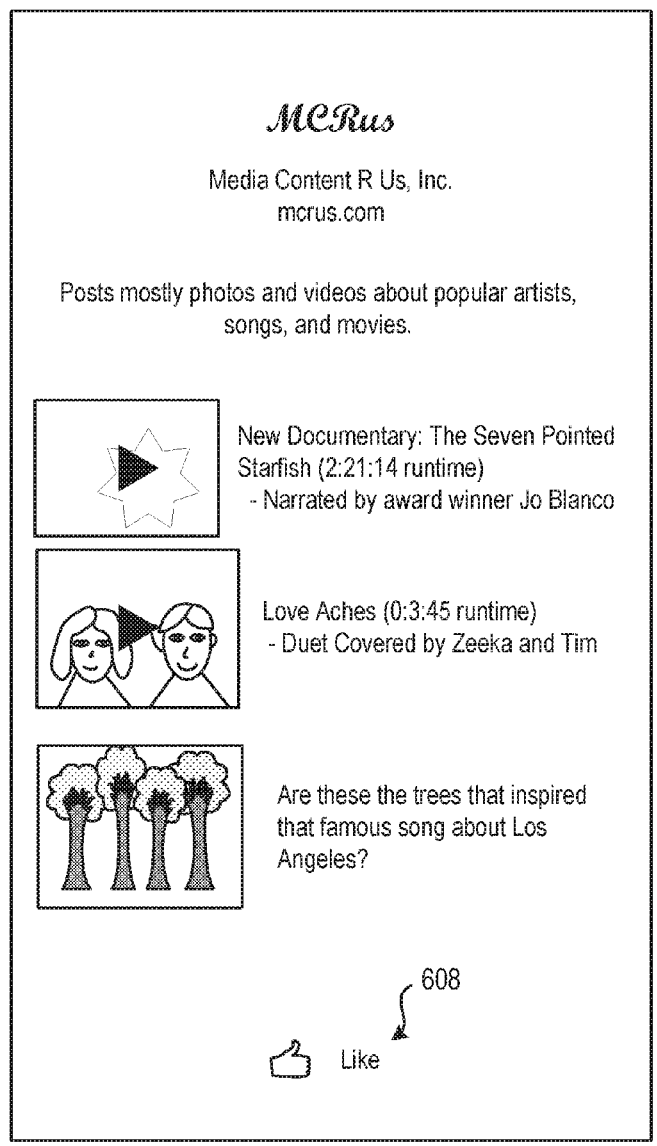
FIG. 6 illustrates an example preview screen, according to an embodiment of the present disclosure.

FIG. 6 illustrates an example preview screen 600 to provide information to assist the user in determining whether to agree to receive content items from an entity, according to an embodiment of the present disclosure. An identification section 602 of the preview screen 600 can display the identity of the entity, such as a logo and business name of the entity. A description section 604 may display the media types and the topics of content items to be provided to the user in her feed in a selected amount of time. An examples section 606 may display selected examples of previously published content items of the entity. The user may assent to the receipt of content items from the entity by clicking or selecting a link 608. As shown in the example of FIG. 6, the entity is a media content provider that will post content items associated with the media types of photos and videos. The content items relate to the topics of popular artists, songs, and movies. In this example, because the content items posted by the entity relate to more than one media type, the examples of content items likewise reflect more than one media type. In particular, the examples of content items include both photos and videos.

In some embodiments, the preview screen or information provided in the preview screen can be presented to the user in any context to invite the user to receive in her feed content items of an entity. For example, a preview screen like the preview screen 400, the preview screen 500, or preview screen 600 may appear in connection with a page suggestion. The page suggestion can serve as an invitation for the user to increase her engagement level with a previously unknown or seldom visited page associated with an entity. As another example, the preview screen or information provided in the preview screen can be provided to the user when the user first visits a new page. During that visit or a subsequent visit, the user may be presented with information about, for example, the identity of the entity, the frequency by which content items of the entity will be provided in the feed of the user, the media types of the content items, and the topics of the content items. The user may be prompted to assent to the provision of content items of the entity in the feed of the user. As yet another example, the preview screen or information provided in the preview screen may be presented to a user engaged in dialogue (e.g., comments, email, instant messaging, etc.) when it is observed that the entity is subject matter of the dialogue.

Figure 7:
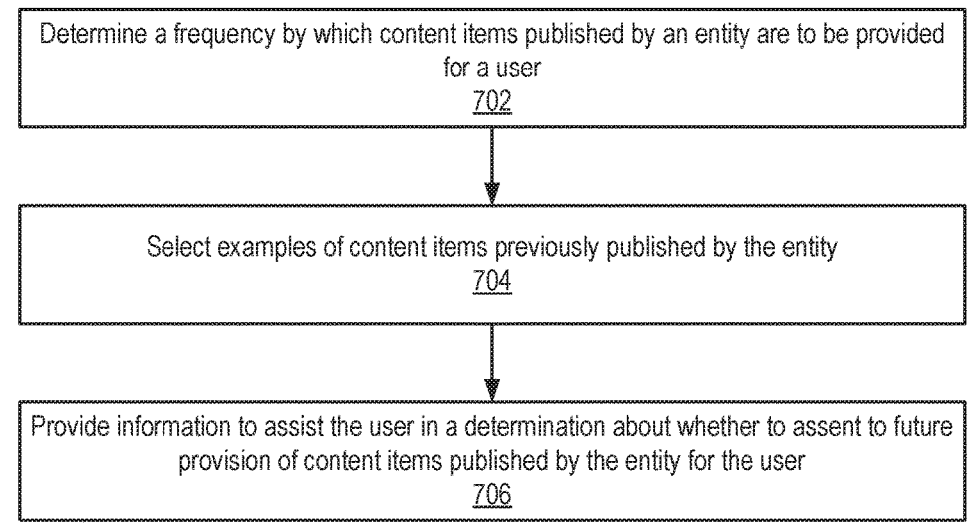
FIG. 7 illustrates an example method, according to an embodiment of the present disclosure.

FIG. 7 illustrates an example method 700 to provide information to assist the user in determining whether to agree to receive content items from an entity, according to an embodiment of the present disclosure. It should be appreciated that there can be additional, fewer, or alternative steps performed in similar or alternative orders, or in parallel, within the scope of the various embodiments unless otherwise stated.

At block 702, the example method 700 can determine a frequency by which content items published by an entity are to be provided for a user. At block 704, the example method 700 can select examples of content items previously published by the entity. At block 706, the example method 700 can provide information to assist the user in a determination about whether to assent to future provision of content items published by the entity for the user. In some embodiments, the steps of the method 700 can be performed by the modules depicted in other figures of the present disclosure, as described in more detailed herein.

Figure 8:
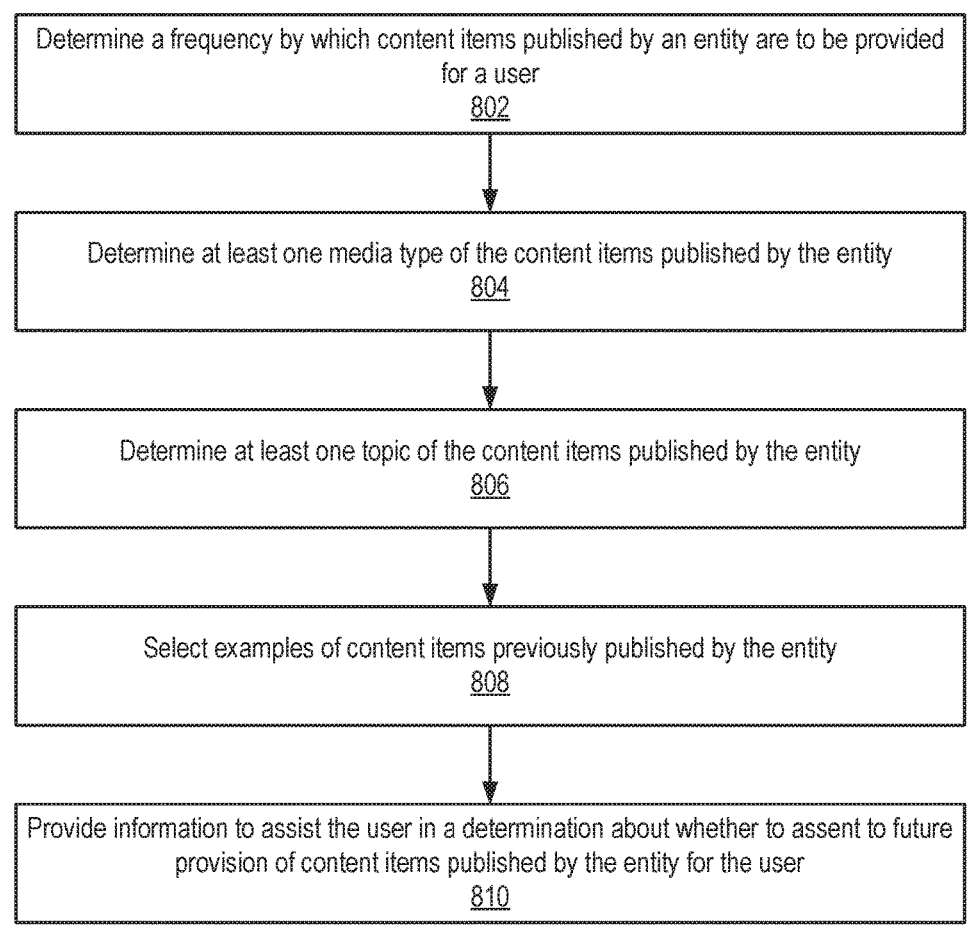
FIG. 8 illustrates an example method, according to an embodiment of the present disclosure.

FIG. 8 illustrates another example method 800 to provide information to assist the user in determining whether to agree to receive content items from an entity, according to an embodiment of the present disclosure. It should be appreciated that there can be additional, fewer, or alternative steps performed in similar or alternative orders, or in parallel, within the scope of the various embodiments unless otherwise stated.

At block 802, the example method 800 can determine a frequency by which content items published by an entity are to be provided for a user. At block 804, the example method 800 can determine at least one media type of the content items published by the entity. At block 806, the example method 800 can determine at least one topic of the content items published by the entity. At block 808, the example method 800 can select examples of content items previously published by the entity. At block 810, the example method 800 can provide information to assist the user in a determination about whether to assent to future provision of content items published by the entity for the user. In some embodiments, the steps of the method 800 can be performed by the modules depicted in other figures of the present disclosure, as described in more detailed herein.

Social Networking System—Example Implementation

Figure 9:
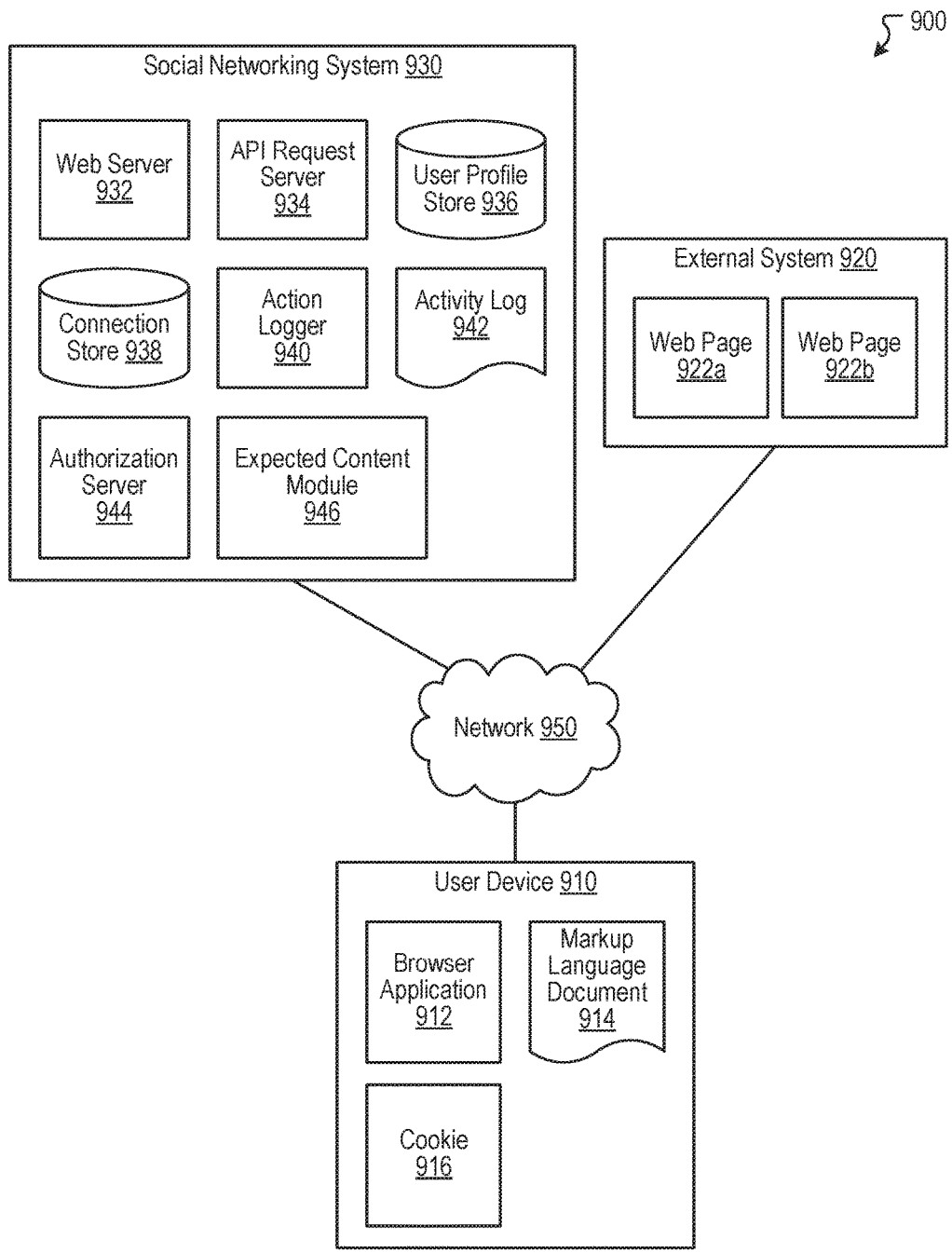
FIG. 9 illustrates a network diagram of an example system that can be utilized in various scenarios, according to an embodiment of the present disclosure.

FIG. 9 illustrates a network diagram of an example system 900 that can be utilized in various embodiments for enhanced video encoding, in accordance with an embodiment of the present disclosure. The system 900 includes one or more user devices 910, one or more external systems 920, a social networking system (or service) 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922*a*, 922*b*, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "oneway." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

In some embodiments, the social networking system 930 can include an expected content module 946. The expected content module 946 can, for example, be implemented as the expected content module 102 of FIG. 1. The expected content module 946 can provide information to assist a user to determine whether or not to assent to the provision of content items published by an entity in the feed of the user. The information may include an identification of the entity, the frequency by which the content items will be provided in the feed of the user, the media types of the content items, the topics of the content items, and examples of content items previously published by the entity to suggest the types of content items that would be provided to the user in the future. Other features of the expected content module 946 are discussed herein in connection with the verified expected content module 102.

Hardware Implementation

Figure 10:
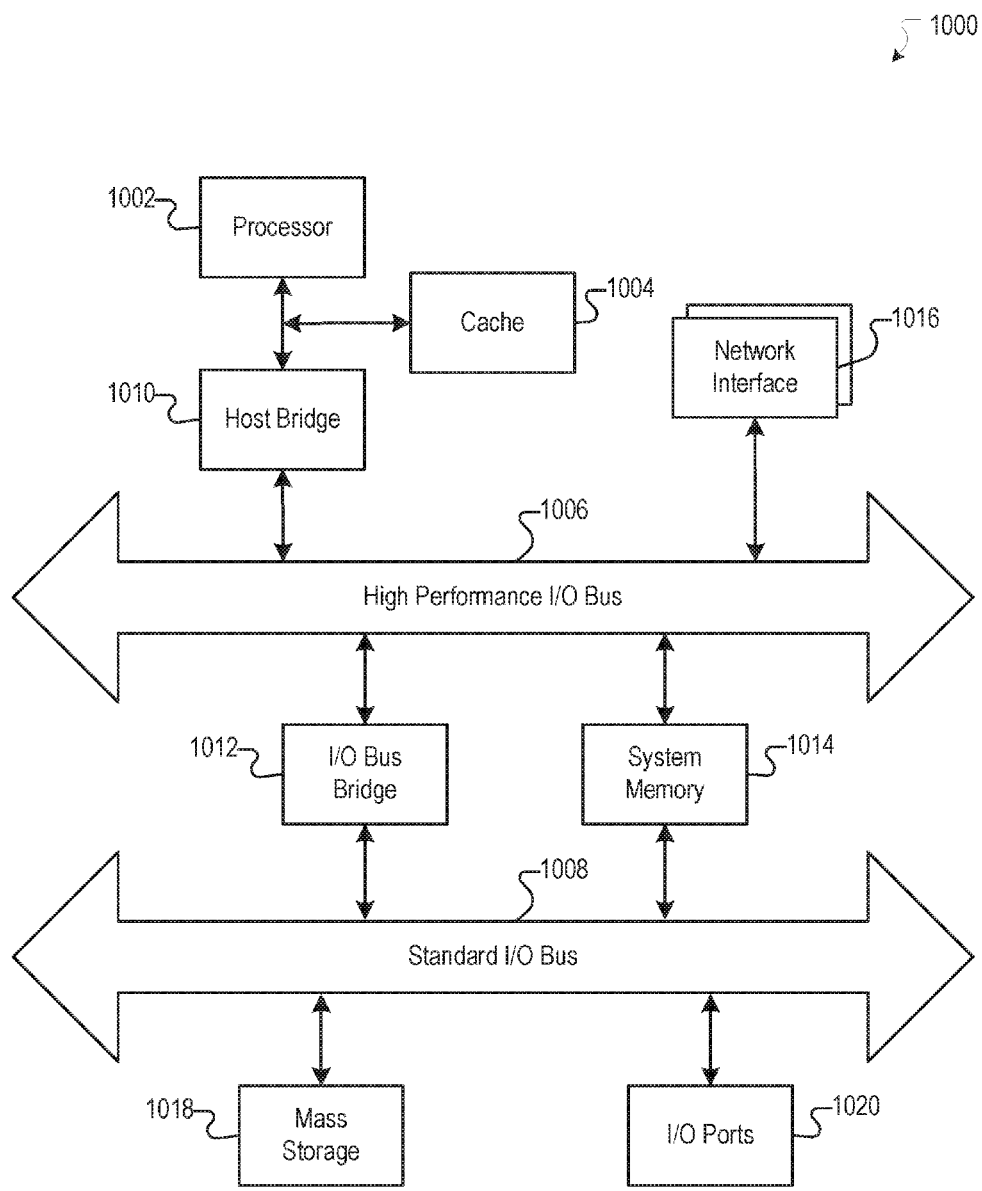
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 1030, the user device 910, and the external system 1020, or a component thereof. In an embodiment of the invention, the computer system 1000 may be one server among many that constitutes all or part of the social networking system 1030.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Moreover, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to one embodiment", an embodiment", "other embodiments", one series of embodiments", some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a frequency at which content items published by an entity are to be provided in a feed of a user of a social networking system based at least in part on quality of the content items; and
   causing, by the computing system, generation of a preview screen to display information to assist the user in a determination about whether to assent to provision of content items published by the entity in the feed of the user, the information including the frequency at which content items published by the entity are to be provided for the user, the preview screen including a description section, an example section to display examples of content items previously published by the entity, and a link for the user to assent to the provision of the content items.

2. The computer-implemented method of claim 1, wherein the information further includes at least one media type of the content items published by the entity.

3. The computer-implemented method of claim 1, wherein the information further includes at least one topic of the content items published by the entity.

4. The computer-implemented method of claim 1, wherein the information further includes examples of content items previously published by the entity.

5. The computer-implemented method of claim 1, further comprising:
   determining at least one media type of the content items published by the entity.

6. The computer-implemented method of claim 1, further comprising:
   determining at least one topic of the content items published by the entity.

7. The computer-implemented method of claim 1, wherein the determining a frequency at which content items published by an entity are to be provided is based at least in part on at least one of historical publication of content items by the entity, historical engagement by a general audience with a page associated with the entity, and other feed inventory of the user.

8. The computer-implemented method of claim 7, wherein the determining a frequency at which content items published by an entity are to be provided further comprises:
   assigning values to each of the at least one of the historical publication of content items by the entity, the historical engagement by a general audience with a page associated with the entity, the quality of the content items, and the other feed inventory of the user;
   assigning a weight to each of the values to generate weighted values; and
   aggregating the weighted values.

9. The computer-implemented method of claim 1, further comprising:
   determining examples of content items previously published by the entity.

10. The computer-implemented method of claim 9, wherein the determining examples of content items previously published by the entity comprises:
    identifying a set of candidate content items from each of most recent content items published by the entity, most typical content items published by the entity, and content items published by the entity most relevant to the user.

11. A system comprising:
    at least one processor; and
    a memory storing instructions that, when executed by the at least one processor, cause the system to perform:
    determining a frequency at which content items published by an entity are to be provided in a feed of a user of a social networking system based at least in part on quality of the content items; and
    causing generation of a preview screen to display information to assist the user in a determination about whether to assent to provision of content items published by the entity in the feed of the user, the information including the frequency at which content items published by the entity are to be provided for the user, the preview screen including a description section, an example section to display examples of content items previously published by the entity, and a link for the user to assent to the provision of the content items.

12. The system of claim 11, wherein the information further includes at least one media type of the content items published by the entity.

13. The system of claim 11, wherein the information further includes at least one topic of the content items published by the entity.

14. The system of claim 11, wherein the information further includes examples of content items previously published by the entity.

15. The system of claim 11, wherein the determining a frequency at which content items published by an entity are to be provided is based at least in part on at least one of historical publication of content items by the entity, historical engagement by a general audience with a page associated with the entity, and other feed inventory of the user.

16. A non-transitory computer-readable storage medium including instructions that, when executed by at least one processor of a computing system, cause the computing system to perform a method comprising:

determining a frequency at which content items published by an entity are to be provided in a feed of a user of a social networking system based at least in part on quality of the content items; and causing generation of a preview screen to display information to assist the user in a determination about whether to assent to provision of content items published by the entity in the feed of the user, the information including the frequency at which content items published by the entity are to be provided for the user, the preview screen including a description section, an example section to display examples of content items previously published by the entity, and a link for the user to assent to the provision of the content items.

17. The non-transitory computer-readable storage medium of claim 16, wherein the information further includes at least one media type of the content items published by the entity.

18. The non-transitory computer-readable storage medium of claim 16, wherein the information further includes at least one topic of the content items published by the entity.

19. The non-transitory computer-readable storage medium of claim 16, wherein the information further includes examples of content items previously published by the entity.

20. The non-transitory computer-readable storage medium of claim 16, wherein the determining a frequency at which content items published by an entity are to be provided is based at least in part on at least one of historical publication of content items by the entity, historical engagement by a general audience with a page associated with the entity, and other feed inventory of the user.

* * * * *